United States Patent [19]

Cummings et al.

[11] Patent Number: 4,779,640
[45] Date of Patent: Oct. 25, 1988

[54] AUTOMATIC DRAIN VALVE

[75] Inventors: Ernie W. Cummings; Ralph W. Farkas, both of Knox County, Tenn.

[73] Assignee: Drain-All, Inc., Louisville, Tenn.

[21] Appl. No.: 88,658

[22] Filed: Aug. 24, 1987

[51] Int. Cl.$^4$ ............................................. F16K 31/34
[52] U.S. Cl. ................................. 137/195; 251/58; 137/413
[58] Field of Search .................. 137/195, 413, 414; 251/58

[56] References Cited

U.S. PATENT DOCUMENTS

| | | | |
|---|---|---|---|
| 2,908,478 | 10/1959 | Starrett | 251/58 |
| 3,245,217 | 4/1966 | Hook | 251/58 X |
| 3,257,783 | 6/1966 | Baker | 137/195 X |
| 4,442,217 | 4/1984 | Cummings | 137/195 |
| 4,562,855 | 1/1986 | Cummings | 137/195 |
| 4,574,829 | 3/1986 | Cummings | 137/195 |

Primary Examiner—Alan Cohan
Attorney, Agent, or Firm—Pitts and Brittian

[57] ABSTRACT

An automatic drain valve for discharging accumulations of condensables and foreign materials from a pneumatic system. The drain valve (10) comprises a reservoir (14) defining an inlet (30) and an outlet (86) for flow-through communications with a pneumatic system. A pilot valve (41) is mounted in the reservoir (14) for selectively communicating pressurized air to a valve operator housed in the base portion (18) of the reservoir (14), such that the valve operator selectively opens and closes a drainage valve (82) communicating with the outlet (88) of the reservoir (14) for selective draining the reservoir. The pilot valve (41) includes a sensor tube (42) which defines a valve seat (44) and includes a magnetized valve plug (46) for selectively engaging the valve seat (44), the valve plug (46) having a selected magnetic polarity. A level sensing float (52) disposed within the reservoir (14) carries an annular magnet (56) normally having a polarity opposite that of the valve plug (46) such that the annular magnet (56) acts upon the valve plug (46) selectively opening and closing the pilot valve (41) as the float (52) rises and falls from a raised position to a lower position with the level of liquid within the reservoir (14).

7 Claims, 3 Drawing Sheets

AUTOMATIC DRAIN VALVE

DESCRIPTION

TECHNICAL FIELD

This invention relates to an automatic drain valve for discharging accumulations of condensables and foreign materials from various pneumatic systems and/or devices.

BACKGROUND ART

In various pneumatic systems and devices it is necessary to remove condensates and other foreign materials to insure proper operation. Various devices such as separators, filter traps, dryers, drip-legs, etc., are used for separating out and collecting condensates and other materials, and such devices are generally provided with drain valves for discharging the collected condensables from the pneumatic system or device. Many different drain valves have been devised for discharging the accumulated materials from pneumatic systems. For example, some drain valves are regulated by timers to automatically open the valve to periodically drain condensates which have been collected. Other drain valves open in response to a certain amount of condensates or other material being collected. One such drain valve system is disclosed in U.S. Pat. No. 4,574,829 issued to Ernie W. Cummings and Nick Valk such patent being a continuation-in-part of U.S. Pat. No. 4,444,217, issued Apr. 24, 1984, there being a previously filed continuation-in-part application resulting in U.S. Pat. No. 4,562,855, issued Jan. 7, 1986. The drain valve system of U.S. Pat. No. 4,574,829 comprises a reservoir for receiving condensates and other material from the pneumatic system. The reservoir of the drain valve is selectively drained by a valve connected to the outlet port of the drain valve's reservoir. In order to open and close the drain valve of the system, an external pneumatic valve operator is required, the valve operator being actuated by pressurized air selectively communicated to the valve operator by a magnetically controlled pilot valve. Still other of these known systems and devices for draining pneumatic systems are described in the background section of the above-identified patents and otherwise cited in such patents. Further, various drain valves marketed by Van Air Systems, Inc., Lake City, Pa. and Hankison Corporation, Canonsburg, Pa., are illustrative of prior art devices.

Therefore, it is an object of the present invention to provide an automatic drain valve for discharging accumulations of condensables and foreign materials present in pneumatic systems.

Another object of the present invention is to provide a drain valve for pneumatic systems which does not require an external valve operator.

Still another object of the present invention is to provide a drain valve which discharges condenates and other materials without expelling air or other gases from the associated pneumatic system.

A further object of the present invention is to provide an automatic drain valve which is self flushing so as to be essentially self cleaning.

Yet another object of the present invention is to provide an automatic drain valve which utilizes an internal pneumatic valve operator and an operatively associated linkage assembly for selectively opening and closing the drainage valve of the drain valve.

Still another object of the present invention is to provide an automatic drain valve which is inexpensive to manufacture and maintain particularly by virtue of its size.

DISCLOSURE OF THE INVENTION

Other objects and advantages will be accomplished by the present invention which provides an automatic drain valve for discharging accumulations of condensables and foreign materials from pneumatic systems. The drain valve comprises a reservoir defining a reservoir volume for collecting condensables and foreign materials. The reservoir includes a head portion and a base portion, and defines an inlet and outlet for flow-through communication with the pneumatic system. The reservoir also includes a pneumatic valve operator mounted in the base portion of the reservoir. The drain valve further comprises a pilot valve housing mounted within the reservoir volume which defines a cavity sealed against communication with the reservoir volume. A pilot valve is mounted within the cavity of the pilot valve housing, the pilot valve including a sensor tube defining a valve seat and including a magnetic valve for engaging the valve seat, such valve plug having a selective magnetic polarity. A buoyant float is also disposed within the reservoir volume. The float is provided with a hole for slidably receiving the pilot valve housing and is movable within the reservoir volume from a lower position to an upper position. Mounted in the float proximate the valve housing is an annular magnet normally having a polarity opposite the polarity of the magnetic valve plug, such that when the float is in the lowest position or is rising within the reservoir, the annular magnet and the magnetic valve plug oppose each other causing the valve plug to close against the valve seat. When the float reaches its uppermost position, the relative polarity of one of the magnets is effectively reversed causing the valve plug to move away from the valve seat. Also provided is a drainage valve communicating with the reservoir outlet for selectively draining the reservoir volume, with linkage means being provided for connecting the pneumatic valve operator to the drainage valve such that the valve operator selectively opens and closes the drainage valve. In this regard, the cavity of the pilot valve housing is placed in communication with a source of pressurized air or gas, and the sensor tube of the pilot valve is placed in fluid communication with the pneumatic valve operator such that the valve operator quickly opens and closes the drainage valve to the reservoir in response to the opening and closing of the pilot valve.

BRIEF DESCRIPTION OF THE DRAWINGS

The above-mentioned features of the present invention will become more clearly understood from the following detailed description of the invention read together with the drawings in which.

BEST MODE FOR CARRYING OUT THE INVENTION

Figure 1A:
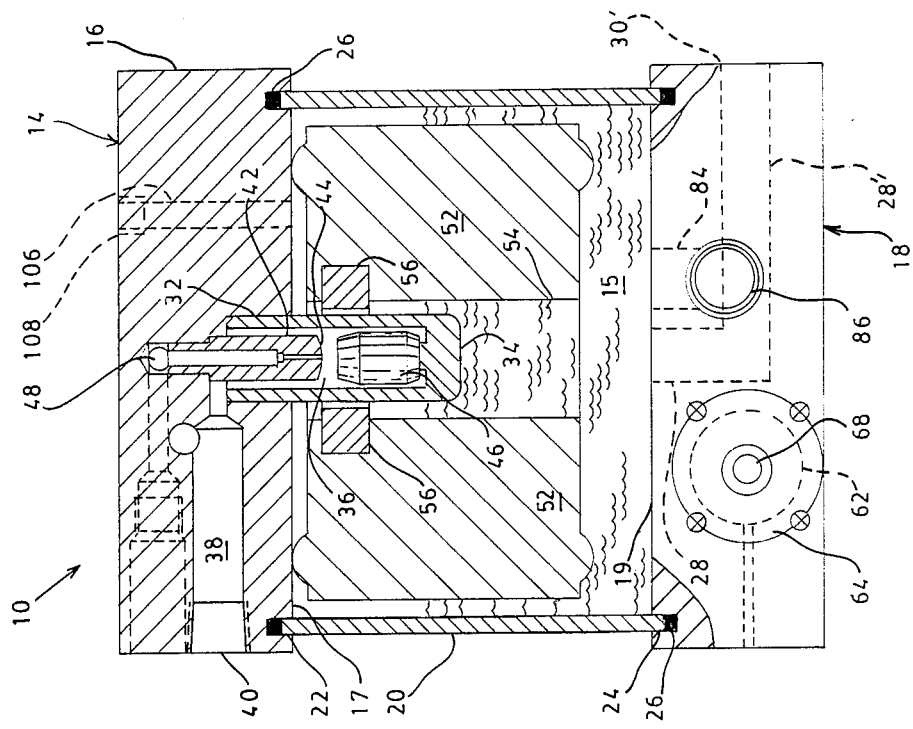
FIG. 1A illustrates a side elevation view, in section, of an automatic drain valve of the present invention.

An automatic drain valve incorporating various features of the present invention is illustrated generally at 10 in the Figures. The drain valve 10 is utilized to automatically drain accumulations of condensables and foreign materials present in a pneumatic system. The valve 10 comprises a reservoir 14 defining a reservoir volume 15 for receiving such condensables and foreign materials. More specifically, the reservoir 14 includes a head portion 16 and a base portion 18, and includes a cylindrical shell or sleeve 20 which extends between the head portion 16 and the base portion 18 so as to form the walls of the reservoir 14. Preferably the sleeve 20 is fabricated of a transparent, or translucent, material such that the condensate level within the reservoir 14 can be viewed from outside of the valve 10.

In order to facilitate the securing of the sleeve 20 between the head portion 16 and the base portion 18, the lower surface 17 of the head portion 16 and the upper surface 19 of the base portion 18 are provided with annular grooves 22 and 24, respectively, for receiving the opposite ends of the sleeve 20. Further, suitable annular seals 26 are positioned in the grooves 22 and 24 to insure the fluid impervious integrity of the reservoir 14. Of course, suitable securing or clamping means (not shown) are provided for securing the sleeve 20 in position between the head portion 16 and the base portion 18.

Figure 1B:
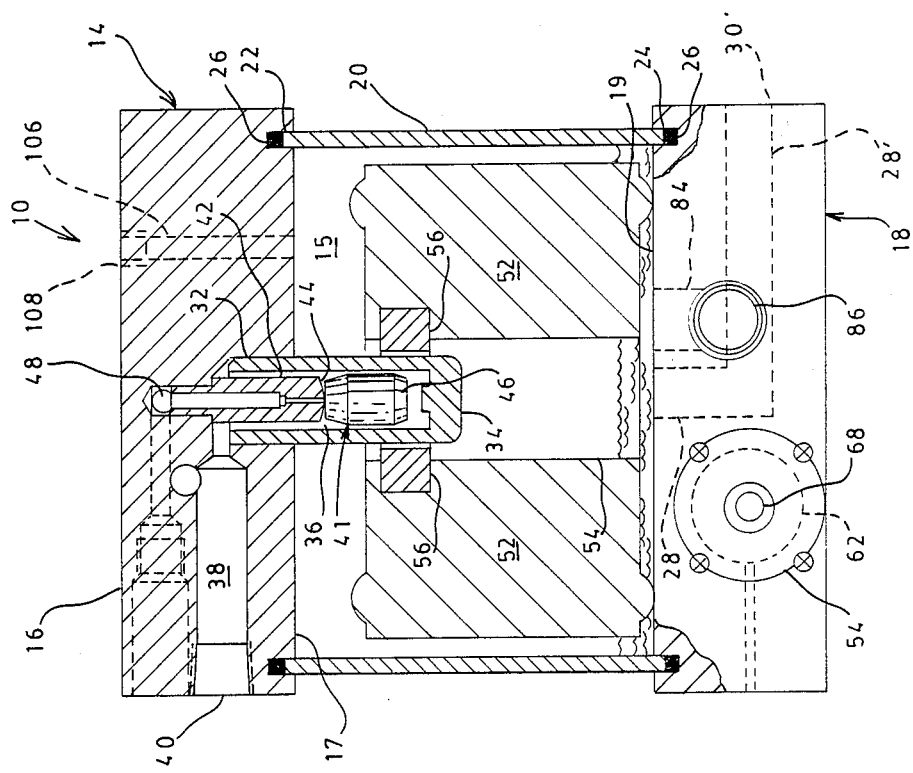
FIG. 1B illustrates a side elevation view, in section, of an automatic drain valve of the present invention.
Figure 2:
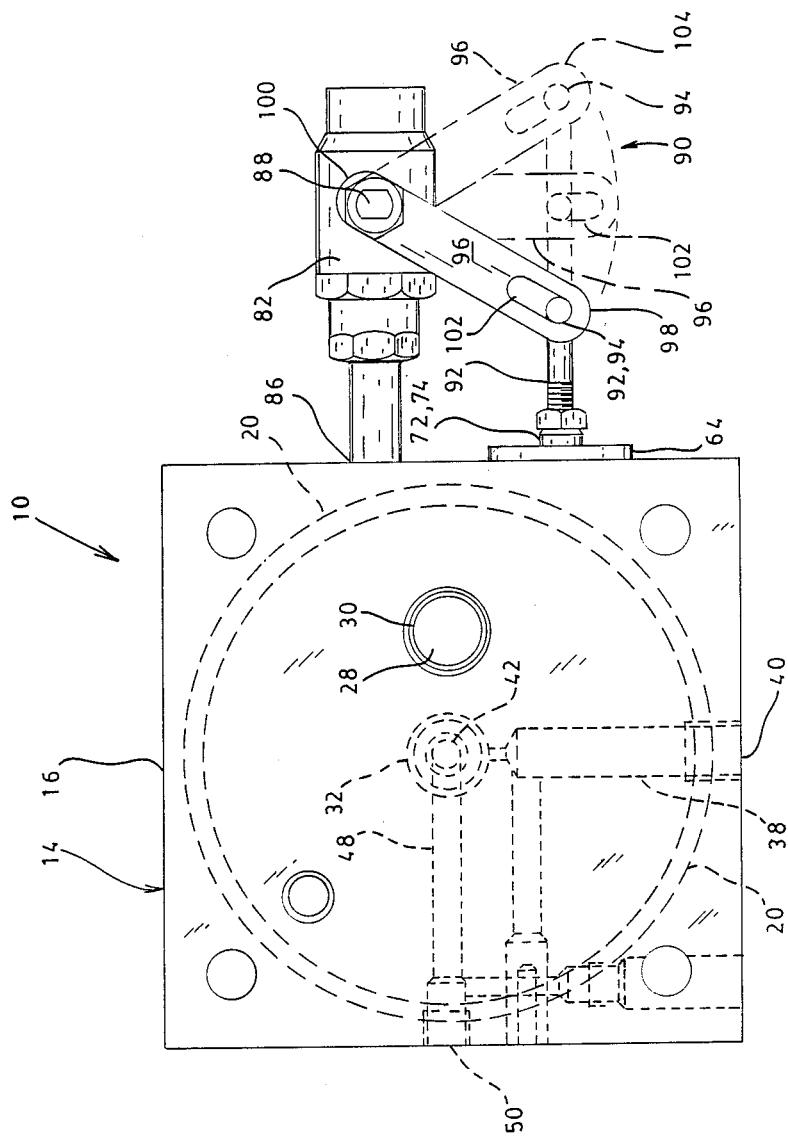
FIG. 2 illustrates a top view of an automatic drain valve of the present invention.
Figure 3A:
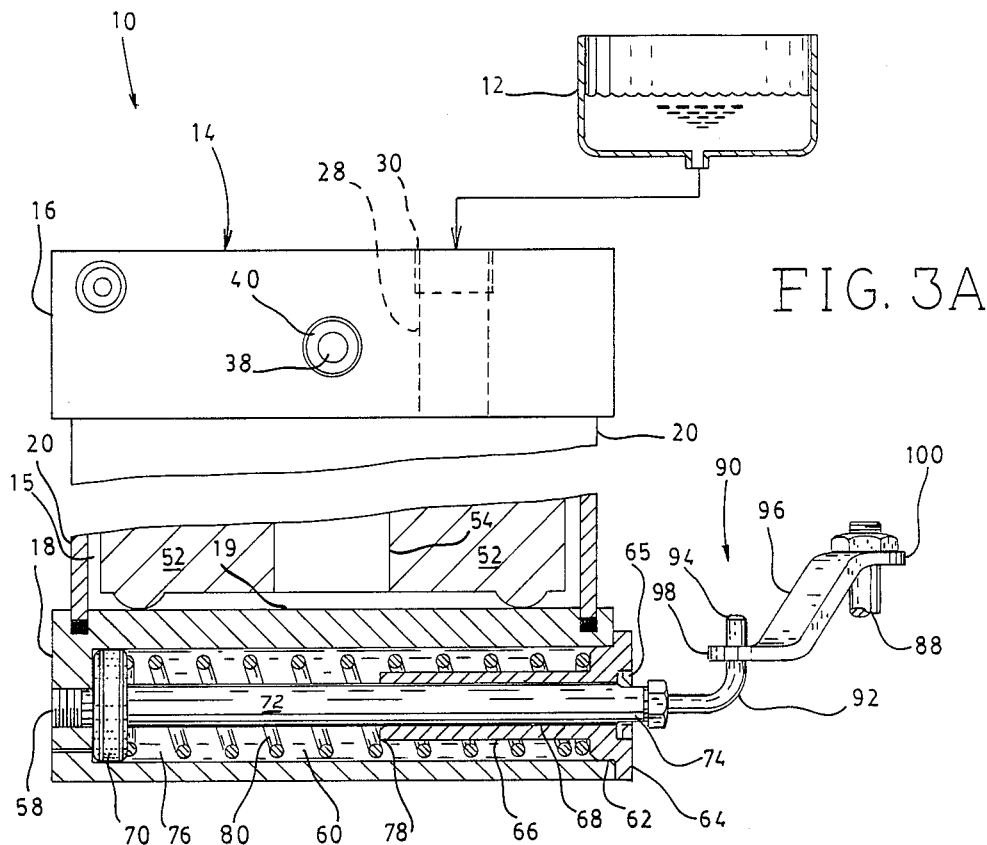
FIG. 3A illustrates a partial side elevation view, partially in section, of an automatic drain valve of the present invention.

As illustrated in FIGS. 2 and 3A, the head portion 16 is provided with a first passageway 28 defining an inlet 30 for connection to the filter trap 12 or other collecting or separating apparatus of pneumatic or other gas system. The first passageway 28 communicates with the reservoir volume 15 such that condensables and foreign materials from, for example, the filter trap 12 of a pneumatic system can be communicated through the inlet 30 and into the reservoir volume 15. Further, as illustrated in FIGS. 1A and 1B, the base portion 18 is provided with an alternate passageway 28' defining an alternate inlet 30' for connecting to a pneumatic system to communicate condensables and foreign materials to the reservoir volume 15. The alternate passageway 28' located in the base portion 18 is utilized primarily for cummunications with ground level collectors and tanks to facilitate the complete draining of such collectors and tanks. Further, by directing the condensates and other materials into the volume 15 through the base portion 18, a stirring action is produced as condensates and other materials enter, breaking up the oil film generally floating on the surface of the condensates within the reservoir and otherwise mixing the substances collected. This mixing effect facilitates the flushing of the reservoir, making the valve 10 essentially self cleaning.

As best illustrated in FIGS. 1A and 1B, the head portion 16 is also provided, on its lower surface 17, with a hole 32 which is closely receptive of a cylindrical pilot valve housing 34, such that the pilot valve housing 34 depends from the head portion 16, extending downwardly into the reservoir volume 15. The pilot valve housing 34 defines a cavity 36 and the head portion 16 is provided with a second passageway 38 communicating therewith, the second passageway 38 defining a second inlet 40 for connection to a suitable source of filtered pressurized air or other gas. Normally the pneumatic system on which the drain valve 10 is installed is used as the source of pressurized air, with a filter (not shown) being provided between the pneumatic system and the inlet 40 to insure that contaminants from the system do not enter the cavity 36. It will be noted that the cavity 36 is sealed against communication with the reservoir volume 15 such that condensates and other material do not enter the cavity 36.

The drain valve 10 further comprises a pilot valve 41 mounted axially within the cavity 36 of the pilot valve housing 34. The pilot valve 41 includes a sensor tube 42 defining a valve seat 44 at its lower end, the sensor tube 42 being mounted within the hole 32 of the head portion 16 and disposed so as to extend axially down into the cavity 36. The pilot valve 41 further includes an axially moving magnetic valve plug 46 disposed in the cavity 36 for selectively engaging the valve seat 44 and closing the sensor tube 42, as will be discussed in detail below. Communicating with the upper end portion of the sensor tube 42 is a third passageway 48 defining an outlet 50 through which pressurized gas supplied to the cavity 36 selectively exits the head portion 16 when the plug 46 is not seated against the valve seat 44.

Disposed within the reservoir volume 15 is a buoyant member or float 52 defining an axial hole 54 slidably receptive of the pilot valve housing 34, such that the float 52 is movable within the volume 15 from a lower position wherein the bottom of the float 52 is in contact with, or proximate to, the upper surface 19 of the base portion 18 (see FIG. 1A) to a raised position wherein the top of the float 52 is in contact with, or proximate to, the under surface 17 of the head portion 16.

Mounted in the annular wall of the hole 54 of the float 52, proximate the top portion thereof, is an annular magnet 56 which encircles the pilot valve housing 34 and serves as an actuator to move the magnetic valve plug 46 in and out of contact with the valve seat 44 in order to operate the pilot valve 41. In this regard, the polarity of the magnet 56 and the magnetic valve plug 46 is chosen such that when the float is in the lower position or is rising within the reservoir, the magnet 56 and the magnetic plug 46 oppose each other causing the plug 46 to close against the valve seat 44. (see FIG. 1A) Resultantly, the pressurized gas entering through the second passageway 38 is not allowed to escape the cavity 36 through the third passageway 48. However, when condensates and other materials entering through the first passageway 28 fill the volume 15 to a level sufficient to elevate the float 52 to the upper position, thereby altering the relative position of the magnet 56 and the plug 46 such that they are substantially aligned in height, the magnetic field generated by the magnet 56 causes an effective reversal in the polarity of the magnetic field within the magnetic plug 46. This effective reversal is not instantaneous due to the hysteresis of the magnetic plug 46. When polarity of the magnetic field is reversed, the plug 46 is repelled by the magnet 56 and, as a result, moves downwardly in the cavity 36 and away from the valve seat 44. Accordingly, pressurized gas is received through the sensor tube 42 and through the third passageway to exit the outlet 50. It should be noted that in order to insure that the plug 46 properly seals the sensor tube 42 when the pilot valve is closed, the plug 46, or at least the upper portion thereof, can be covered with a rubber material or other suitable sealant material. One suitable covering material is Nitrile which provides the desired sealing effect and provides an outer surface which resists the accumulation of liquids and other materials which might affect the proper operation of the valve.

As indicated above, when the pilot valve 41 is opened in response to condensates and other materials rising to a preselected level in the volume 15, pressurized gas exits the outlet 50 of the head portion 16. The outlet 50 is connected in fluid communication with a pneumatic valve operator mounted in the base portion 18. More specifically, the outlet 50 is connected, as with a suitable tube or pipe (not shown), with an inlet port 58 defined in the base portion 18, the inlet port 58 communicating with a cylindrical piston cavity 60 provided in the base portion 18. (see FIGS. 3A and 3B). Access to the cavity 60 is provided through an opening 62 in the base portion 18, the opening 62 being provided with a cap 64 carrying an axial sleeve 66 and provided with an axial hole 68 therethrough. A piston member 70 carrying an actuator arm 72 is slidably mounted within the cavity 60, the actuator arm 72 being slidably received through the hole 68 of the cap 64 such that the outboard end portion 74 of the arm 72 is external to the base portion 18. The piston member 70 is capable of reciprocal movement between the forward end portion 76 of the cavity 60 and the inboard end portion 78 of the sleeve 66. However, the piston member 70 is biased toward the forward end portion 76 of the cavity 60 by a spring member 80. Thus, in the absence of pressurized air being injected into the cavity 60 via the inlet port 58, the piston member 70 is maintained in the position illustrated in FIG. 3A. But, when the pilot valve opens and pressurized gas is injected into the cavity 60 overcoming the bias of the spring member 80, the piston member 70 travels toward the sleeve 66 and assumes the position illustrated in FIG. 3B with the actuator arm 72 assuming a fully extended position.

In the preferred embodiment, the side walls of the valve of the piston cavity 60 are roller burnished to provide a hard, smooth surface, thereby reducing, or obviating, the need for lubrication of the piston member 70. Further, the cap 64 is preferably fabricated of a durable plastic, such as Delrin, which provides a smooth surface so as to allow the actuator arm 72 to reciprocate freely in the axial hole 68 without lubricants. Also, the cap 64 can be provided with an annular wiper 65 which cleans the actuator arm 72 as it reciprocates and insures that dirt and other materials are not carried into the piston cavity 60 by the arm 72.

The reciprocal movement of the actuator arm 72 is utilized to selectively open and close a drainage valve 82 (see FIG. 2), the drainage valve 82 serving to selectively drain condensates and other materials from the volume 15. In this regard, the base portion 18 is provided with a drainage conduit 84 communicating with the volume 15 and which defines an outlet 86. The drainage valve 82 communicates with the outlet 86 so as to selectively allow condensates and other material to drain from the volume 15 via the drainage conduit 84 and is opened and closed by selective rotation of an actuator stem 88. Accordingly, a linkage assembly 90 is provided for translating the reciprocal movement of the actuator arm 72 into rotational movement of the actuator stem 88. In the preferred embodiment, the linkage assembly 90 comprises an L-shaped member 92 secured to the outboard end portion 74 of the actuator arm 72, the L-shaped member 92 having a free arm portion 94 disposed substantially perpendicular to the axis of the actuator arm 72. The linkage assembly 90 further comprises a bracket 96 having first and second end portions 98 and 100, respectively. The first end portion 98 is provided with a slot 102 for slidably receiving the free arm portion 94 of the L-shaped member 92 and the second end portion 100 is secured to the actuator stem 88 of the drainage valve 82 such that the bracket 96 pivots from the axis of the actuator stem. It will be noted that the slot 102 accommodates the arcuate travel of the first end portion 98 of the bracket 96 as the actuator arm 72 reciprocates linearly.

Figure 3B:
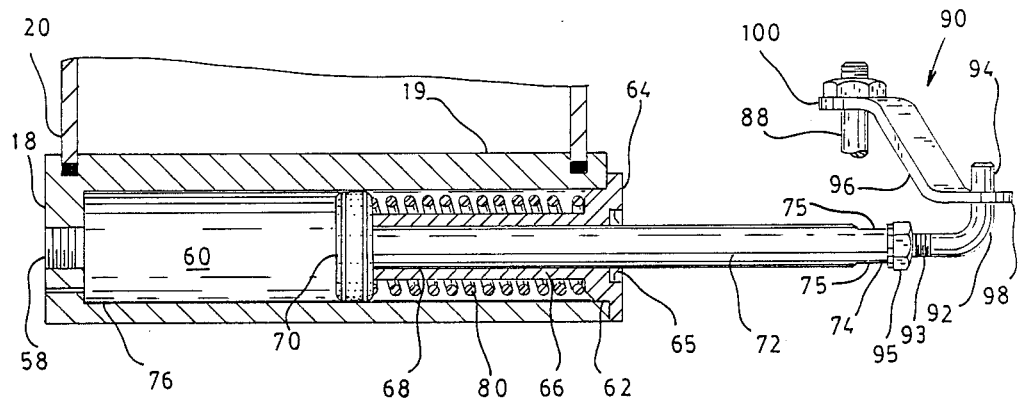
FIG. 3B illustrates a partial side elevation view, in section, of an automatic drain valve of the present invention.

With respect to operation of the linkage assembly 90, when the piston member 70 is in the forward end portion 76 of the cavity 60 such that the actuator arm 72 is in the fully retracted position illustrated by the solid lines in FIG. 2, and as illustrated in FIG. 3A, the actuator stem 88 is rotationally oriented such that the valve 82 is in a closed position prohibiting the volume 15 from being drained. However, as the piston member 70 is forced into contact with the sleeve 66 in response to the injection of pressurized gas into the piston cavity 60 the actuator arm moves to the fully extended position illustrated in phantom lines at 104 in FIG. 2, and as illustrated in FIG. 3B. As the actuator arm 72 extends, the bracket 96 is pivoted, thereby rotating the actuator stem 88 such that when the actuator arm 72 reaches the fully extended position, the valve 88 is opened to allow the volume 15 to be drained.

In the preferred embodiment, the L-shaped member 92 is provided with a threaded portion 93 which is received in a threaded receptor provided in the outboard end portion 74 of the actuator arm 72 such that the L-shaped member 92 can be axially reciprocated relative to the arm 72. This allows the position of the free arm portion 94 to be adjusted to produce the proper range of motion in the bracket 96 to open and close the valve 82. In order to facilitate the adjustment of the L-shaped member 92, the outboard end portion 74 of the arm 72 can be provided with the wrench flats 75 such that a wrench can be used to engage and rotate the arm 72. Further, the L-shaped member 92 can be provided with a locking nut 95 to lock the member 92 in place when properly adjusted.

Thus, it will be understood that when the level of condensates and other materials within the volume 15 rises to a preselected level, raising the float 52, the interaction of the magnetic valve plug 46 and the magnet 56 as described above opens the pilot valve 41 allowing pressurized air to be communicated to the inlet 58. This injection of pressurized air forces the piston member 70 axially thereby moving the actuator arm 72 to the fully extended position so as to open the drainage valve 82, allowing the volume 15 to drain. Of course, as the condensates and other materials drain from the volume 15 the float 52 drops within the volume 15 until magnet polarity reversal occurs and the plug 46 seats against the valve seat 44, cutting off pressurized air to the piston cavity 60. As a result, the spring member 80 biases the piston member 70 back to its initial position carrying the actuator arm to its retracted position and closing the drainage valve 82. It will be recognized that the magnetic polarity reversal occurs at the top and bottom extremes of travel of the float 52 due to the delay imparted by the magnetic hysteresis during reversal. Resultantly, the pilot valve, and thus the drainage valve 82, operates in a "snap on" and "snap off" manner, insuring that the reservoir volume 15 does not over fill or drain prior to being substantially filled.

As best illustrated in FIGS. 1A and 1B, the head portion 16 of the reservoir 14 is provided with a further conduit 106 communicating with the reservoir volume 15, the conduit 106 defining an inlet 108 for communicating with a source of pressurized air or gas. Generally this source of pressurized air is the pneumatic system on which the drain valve 10 is installed such that the air pressure above the condensates within the volume 15 is substantially equal to the pressure within associated pneumatic system. Given the pressurization of the volume 15, when the drainage valve 82 snaps to the open position most of the condensates within the volume 15 are quickly flushed from the drain valve 10. However, as illustrated in FIG. 1A, when the float 52 reaches the bottom extreme of travel, and the valve 82 snaps to an off position, a preselected amount of condensate remains in the reservoir volume 15 to maintain a liquid barrier between the pressurized air within the volume 15 and the outlet 86. It will be understood that if the drain valve 10 was allowed to fully drain, as is the case with a various prior art drain valves, a loss of compressed air from the pneumatic system would occur through the outlet port 86 and valve 82. Further, many prior art drain valves generate a great deal of noise when activated, mainly due to the discharge of compressed air which follows the flushing of the condensates. However, the drain valve 10, by not fully flushing the reservoir 14 avoids the noise of the explusion of compressed air, and the associated cost and inefficiency of lost compressed air.

It should also be noted that in the preferred embodiment the drainage valve 82 comprises a ball valve rather that a poppet valve as is utilized by certain conventional drain valves. In this regard, in such prior art drain valves foreign matter tends to build up on poppet valve surfaces and the associated valve seat prohibiting the valve from properly closing and making frequent cleaning a necessity. However, the ball valve of the present invention shears off dirt and foreign matter from valve surfaces during operation making the valve 82 essentially self cleaning, with the self cleaning ability of the valve being enhanced by the forceful "snap on" and "snap off" operation of the valve operator and valve 82. It will also be recognized that the spring 80 biases the valve 82 to a closed position such that should the drain valve 10 fail for any reason the drainage valve 82 will remain in a closed position, unlike many prior art valves which frequently fail in an open position resulting in loss of compressed air and/or air pressure within the associated pneumatic system.

In light of the above it will be appreciated that the drain valve 10 automatically accumulates and ejects condensates and solid contaminants from air receiver tanks, airline drip legs, intercooler and aftercooler separators and various other pneumatic systems and devices. The drain valve 10 can utilize the existing line pressure of the associated pneumatic system to eject condensates without wasting valuable compressed air, and its operation is fully pneumatic such that no electricity is required and the valve is safe for use in flammable environments. The pilot valve 41 and other actuating controls are isolated from the reservoir 15, and the pressurized air actuating the pilot valve 41 is filtered through an air filter (ideally 40 micron at 40), so as to reduce the possibility of valve failure and so as to reduce cleaning and maintenance. Moreover, the alternate passageway 28' provided in the base portion 18 allows complete drainage of ground level tanks and systems.

While a preferred embodiment has been shown and described, it will be understood that there is no intent to limit the invention to such disclosure, but rather it is intended to cover all modifications and alternate constructions falling within the spirit and scope of the invention as defined in the appended claims.

I claim:

1. An automatic drain valve for selectively discharging accumulations of condensable and foreign materials from a pneumatic system, said automatic drain valve comprising:

a reservoir defining a reservoir volume for collecting said condensables and foreign materials, said reservoir including a head portion and a base portion, said reservoir being provided with an inlet and an outlet for flow-through communications with said pneumatic system, said inlet communicating with said reservoir volume centrally of said base portion, said base portion provided with a transverse cylindrical cavity terminating in an opening on an edge of said base portion;

a pilot valve housing centrally mounted within said reservoir volume of said reservoir, said pilot valve housing defining a cavity, said cavity being sealed against communication with said resevoir volume;

a pilot valve mounted axially within said cavity of said pilot valve housing, said pilot valve including a sensor tube, a valve seat at a first end of said sensor tube, and an axial moving magnetic valve plug of one polarity for selectively engaging said valve seat;

a buoyant float responsive to liquid in said reservoir volume, said float being provided with a hole for slidably receiving said pilot valve housing, said float being movable within said reservoir volume from a lower position to an upper position;

an annular magnet mounted in said float proximate said pilot valve housing, said annular magnet normally having a polarity opposite the polarity of said magnetic valve plug;

a piston member reciprocally mounted in, and in slidable contact with, said cavity in said base portion, said piston member carrying an actuator arm extending through said opening in said base portion edge, said actuator arm defining an outboard end portion;

a biasing means within said cylindrical cavity for normally biasing said piston member and said actuator arm to a retracted position in said cavity;

a drainage valve for said reservoir, said drainage valve having an inlet and an outlet, said inlet communicating with said outlet of said reservoir;

a linkage means for connecting said outboard end portion of said actuator arm to said drainage valve, whereby said actuator arm selectively opens and closes said drainage valve; and pneumatic means connected between said pilot valve and said cavity whereby said actuator arm quickly opens said drainage valve when said float reaches said upper position and quickly closes said drain valve when said float reaches said lower position, said pneumatic means comprising a first conduit connecting said cavity of said pilot valve housing in fluid communication with a source of filtered air and a second conduit connecting said sensor tube in fluid communication with said cavity.

2. The automatic drain valve of claim 1 wherein said drainage valve includes a rotatable actuator stem for selectively opening and closing said drainage valve to the flow of said condensables and foreign materials, and wherein said linkage means comprises an L-shaped member secured to said outboard end portion or said actuator arm, said L-shpaed member having a free arm portion disposed substantially perpendicular to said actuator arm, said linkage means further including a bracket member having a first end portion defining a slot for receiving said free end portion of said L-shaped member and a second end portion for engaging said actuator stem of said drainage valve, whereby selective axial movement of said actuator arm rotates said actuator stem for opening and closing said drainage valve.

3. The automatic drain valve of claim 2 wherein said outboard end portion of said actuator arm is provided with a threaded receptor and said L-shaped member includes a threaded end portion for being received in said threaded receptor, whereby said threaded end portion can be threadably reciprocated in said threaded receptor in order to adjust the position of said free end portion.

4. The automatic drain valve of claim a wherein said head portion defines an under surface, and wherein said pilot valve housing engages, and extends downwardly from, said under surface of said head portion so as to extend into said reservoir volume.

5. An automatic drain valve for selectively discharging accumulations of condensables and foreign materials from a pneumatic system, said automatic drain valve comprising:
  a reservoir defining a reservoir volume for collecting said condensables and foreign materials, said reservoir including a head portion, a wall portion and a base portion, said base portion being provided with a transverse piston cavity having a first end portion and a second end portion and provided with a gas inlet communicating with said first end portion of said piston cavity, said base portion also defining an opening at said second end portion of said piston cavity, with a cap member defining a hole therethrough being received in said opening, said reservoir being provided with a further inlet and an outlet for flow-through communications with said pneumatic system, said further inlet communicating with said reservoir volume centrally of said base member;
  a piston member reciprocally mounted in, and in slidable contact with, said piston cavity, said piston member carrying an actuator arm defining an outboard end portion for being slidably received through said hole in said cap member;
  a spring member within said piston cavity for biasing said piston member toward said first end portion of said piston cavity;
  a pilot valve housing supported from said head member and centrally mounted within said reservoir volume of said reservoir, said pilot valve housing defining a cavity, said cavity being sealed against communication with said reservoir volume;
  a pilot valve mounted axially within said cavity of said pilot valve housing, said pilot valve having a sensor tube in fluid communication with said gas inlet of said base portion, said sensor tube having a first end portion defining a valve seat, said pilot valve further including a magnetic valve plug of one polarity for selectively engaging said valve seat;
  a buoyant float responsive to liquid in said reservoir volume, said float being provided with a central hole for slidably receiving said pilot valve housing, said float being movable within said reservoir volume from a lower position to an upper position;
  an annular magnet mounted in said float proximate said pilot valve housing, said annular magnet normally having a polarity opposite the polarity of said magnetic valve plug;
  a drainage valve for said reservoir, said drainage valve having an inlet and an outlet, said inlet of said drainage valve communicating with said outlet of said reservoir, said drainage valve being provided with a rotatable actuator stem for selectively opening and closing said drainage valve;
  a linkage means for connecting said actuator arm to said drainage valve whereby reciprocation of said actuator arm selectively opens and closes said drainage valve, said linkage means including an L-shaped member secured to said outboard end portion of said actuator arm, said L-shaped member having a free arm portion disposed substantially perpendicular to said actuator arm, said linkage means further including a bracket member having a first end portion defining a slot for receiving said free end portion of said L-shaped member and a second end portion for engaging said actuator stem of said actuator arm rotates said actuator stem for opening and closing said drainage valve; and
  pneumatic means connected between said pilot valve and said valve operator whereby said actuator arm quickly opens said drainage valve when said float reaches said upper position and quickly closes said drain valve when said float reaches said lower position, said pneumatic means comprising a first conduit connecting said cavity of said pilot valve housing in fluid communication with a source of filtered air and a second conduit connecting said sensor tube in fluid communication with said gas inlet of said piston cavity.

6. The automatic drain valve of claim 5 wherein said wall portion of said reservoir comprises a translucent sleeve whereby the level of said condensables and foreign materials within said reservoir volume can be viewed from exterior to said drain valve.

7. The automatic drain valve of claim 5 wherein said wall portion of said reservoir comprises a transparent sleeve whereby the level of said condensables and foreign materials within said reservoir volume can be viewed from exterior to said drain valve.

* * * * *